(12) United States Patent
Karandikar et al.

(10) Patent No.: US 10,564,624 B2
(45) Date of Patent: Feb. 18, 2020

(54) OPTIMAL MACHINING PARAMETER SELECTION USING A DATA-DRIVEN TOOL LIFE MODELING APPROACH

(71) Applicant: General Electric Company, Schenectady, NY (US)

(72) Inventors: Jaydeep Karandikar, Niskayuna, NY (US); Jayakrishnan Unnikrishnan, Jersey City, NJ (US); Andrew Henderson, Simpsonville, SC (US); Kati Illouz, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 15/932,318

(22) Filed: Feb. 16, 2018

(65) Prior Publication Data
US 2019/0258222 A1    Aug. 22, 2019

(51) Int. Cl.
*G05B 19/4065*    (2006.01)
*G05B 19/416*    (2006.01)
*G05B 19/404*    (2006.01)

(52) U.S. Cl.
CPC ....... *G05B 19/4065* (2013.01); *G05B 19/404* (2013.01); *G05B 19/416* (2013.01); *G05B 2219/37252* (2013.01)

(58) Field of Classification Search
None
See application file for complete search history.

(56) References Cited

U.S. PATENT DOCUMENTS

| | | | |
|---|---|---|---|
| 5,903,474 A | 5/1999 | Sadler | |
| 7,603,289 B2 | 10/2009 | Kriedler et al. | |
| 8,219,451 B2 | 7/2012 | Kriedler et al. | |
| 9,460,170 B2 | 10/2016 | Boensch et al. | |
| 2016/0091393 A1 | 3/2016 | Liao et al. | |
| 2016/0349737 A1 | 12/2016 | Yen et al. | |
| 2017/0364056 A1* | 12/2017 | Ono | G05B 19/4065 |

FOREIGN PATENT DOCUMENTS

| | | |
|---|---|---|
| CN | 103500251 | 1/2014 |
| JP | 2010146537 | 7/2010 |

OTHER PUBLICATIONS

Karandikar et al., "Cost optimization and experimental design in milling using surrogate models and value of information," Journal of Manufacturing Systems, 2014, 8 pages.

Karandikar et al., "Spindle speed selection for tool life testing using Bayesian inference," Journal of Manufacturing Systems, 2012, 9 pages.

Karandikar et al., "Value of information method for optimization and experimental design using surrogate models," ScienceDirect, Manufacturing Letters 2, 2014, pp. 108-111, 4 pages.

* cited by examiner

*Primary Examiner* — Sean Shechtman
(74) *Attorney, Agent, or Firm* — Amin, Turocy & Watson, LLP

(57) ABSTRACT

Systems, computer-implemented methods and/or computer program products that facilitate generating operating parameters are provided. In one embodiment, a computer-implemented method comprises: generating, by a system operatively coupled to a processor, tool life models using a tool wear data set, wherein the tool wear data set is based on production data or predetermined data; and generating, by the system, operating parameters for machining operations based on the tool life models and baseline operational parameters.

20 Claims, 12 Drawing Sheets

- Machining cost modeling:

$$C = C_T + C_F = t_m \times C_{sh} + \left( \frac{t_{ct}}{n_{uf}} \times C_{sh} + \frac{C_N + (C_r * n_{ar})}{(n_{uf}/n_i) * (n_{ar} + 1)} \right)$$

Total cost: $C = C_T + C_F$ $C_F$ = tool/insert usage costs per feature/part
$t_{ct}$ - tool change time in minutes
$n_{uf}$ - number of features/tool
$C_{sh}$ - shop rate in $/minutes
$C_N$ - tool cost
$C_r$ - regrind cost
$n_i$ - number of insert edges/tool
$n_{ar}$ - number of regrinds $C_T$ = cost of time per feature/part
$t_m$ - cycle time in minutes

FIG. 4

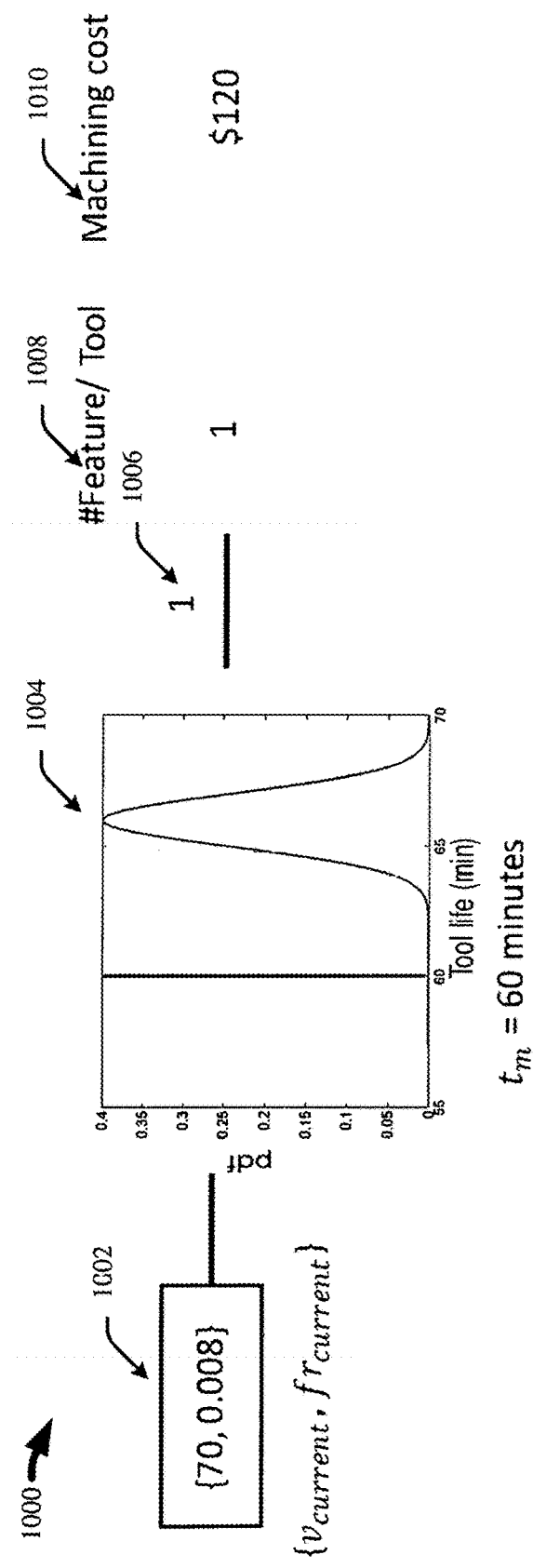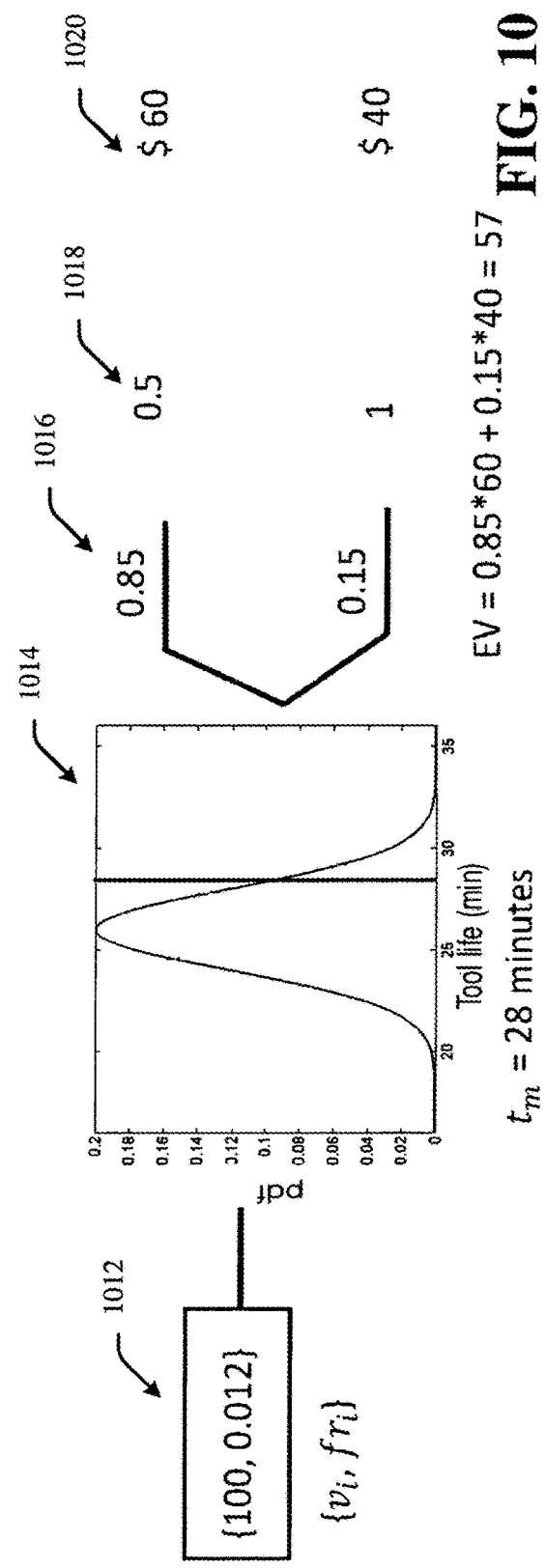
FIG. 10

OPTIMAL MACHINING PARAMETER SELECTION USING A DATA-DRIVEN TOOL LIFE MODELING APPROACH

BACKGROUND

The subject disclosure relates to facilitating recommending optimal operating parameters, and more specifically, facilitating optimal machining parameter selection using a data-driven tool life modeling approach.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments herein, devices, systems, computer-implemented methods, apparatus and/or computer program products that facilitate recommending optimal operating parameters.

According to one embodiment, a system is provided. The system can comprise a memory that stores computer executable components. The system can also comprise a processor, operably coupled to the memory, and that can execute computer executable components stored in the memory. The computer executable components can comprise a modeling component that generates tool life models using a tool wear data set, wherein the tool wear data set is based on production data or predetermined data. The computer executable components can further comprise a recommendation component that generates operating parameters for machining operations based on the tool life models and baseline operational parameters.

According to another embodiment, a computer-implemented method is provided. The computer-implemented method can comprise generating, by a system operatively coupled to a processor, tool life models using a tool wear data set, wherein the tool wear data set is based on production data or predetermined data. The computer-implemented method can further comprise generating, by the system, operating parameters for machining operations based on the tool life models and baseline operational parameters.

According to another embodiment, a computer program product facilitating generating operating parameters is provided. The computer program product can comprise a computer readable storage medium having program instructions embodied therewith. The program instructions can be executable by a processor to cause the processor to generate tool life models using a tool wear data set, wherein the tool wear data set is based on production data or predetermined data. The program instructions can further be executable by a processor to cause the processor to generate operating parameters for machining operations based on the tool life models and baseline operational parameters.

DESCRIPTION OF THE DRAWINGS

FIG. 4 illustrates an example, non-limiting equation facilitating recommending optimal operating parameters in accordance with one or more embodiments described herein.

FIGS. 9 and 10 illustrate example, non-limiting methodologies facilitating recommending optimal operating parameters in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments described herein can comprise a web-application to provide a user interface for the user to determine optimal parameters for machining operations and store tool life data and create a tool life database. As used herein, the term "operating parameter," "parameter for machining operations," "machining parameter" and the like can be used interchangeably. The web-application can allow users to determine the optimal operating parameters (e.g., cutting speed and feed rate) for machining operations to minimize total operating cos, e.g., to reduce an initial cost to an updated cost. The optimal operating parameters (e.g., generated operating parameters) can reduce an initial cost to an updated cost. The updated cost can be lower than the initial cost. The initial cost can be the cost of using the baseline operational parameters and the updated cost can be the cost of using the generated operating parameters. The web-application can use an algorithm for tool life modeling. One or more embodiments described herein can use censored data and a data augmentation method to combine the statistical models with the physics of the wearing process to address the issue of limited data. For example, in the absence of tool wear data, the tool life model can be generated using expert knowledge or expert opinions. In another example, a user has the privy to edit the results based on the user's experience. As used herein, the term "expert opinions" and "expert knowledge" can be used interchangeably to mean predetermined data. Furthermore, expert knowledge can also come from literary reviews. In another example, predetermined data can be knowledgebase data from learned experience, textbooks, training manuals, etc.

Figure 1:
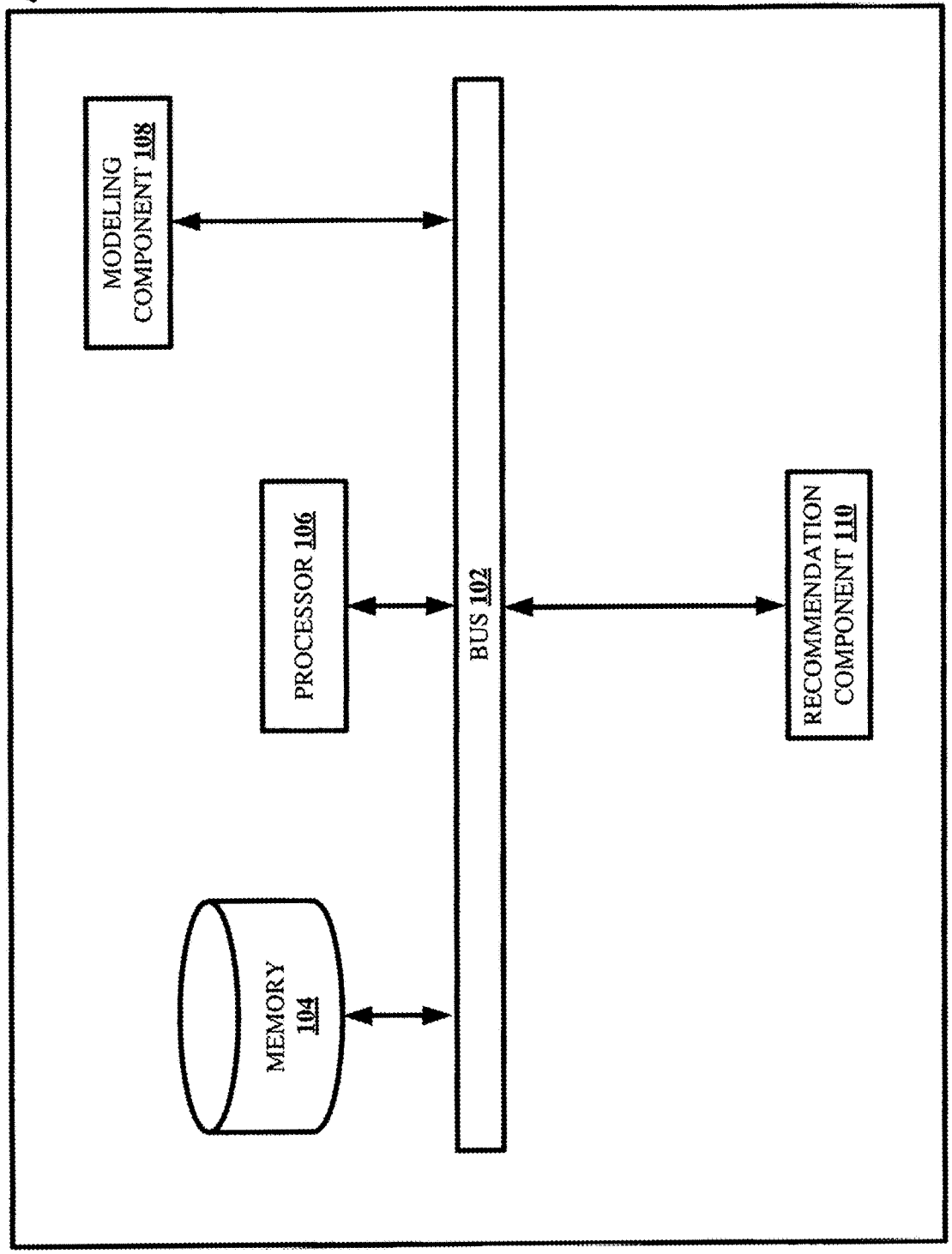
FIG. 1 illustrates a block diagram of an example, non-limiting system facilitating recommending optimal operating parameters in accordance with one or more embodiments described herein.

FIG. 1 illustrates a block diagram of an example, non-limiting system 100 facilitating recommending optimal operating parameters in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, the system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise bus 102, memory 104, processor 106, modeling component 108 and/or recommendation component 110. The bus 102 can provide for interconnection of various components of the system 100. The memory 104 and processor 106 can carry out computation and/or storage operations of the system 100 as described herein. It is to be appreciated that in some embodiments one or more system components can communicate wirelessly with other components, through a direct wired connection or integrated on a chipset.

In one or more embodiments described herein of system 100, predictive analytics can be used to automatically generate tool life models used by the system 100 to facilitate recommending optimal operating parameters. For example, the automatic generation can be based on information retained in a knowledgebase. As used herein, the term "knowledgebase" can be a database or other storage location or repository that can store one or more types of information. All such embodiments are envisaged.

The knowledgebase can comprise information related to tool wear data. In some embodiments, the information related to the tool wear data can be gathered over time and retained in the knowledgebase. In some embodiments, the information gathered can include machine details, machining parameters such as cutting speed, feed rate, and depth of cut, material type, type of cut, tool setup, tool type, tool cost, number of tool usages, coolant conditions, labor rate, etc. Based on the obtained information, the system 100 can evaluate the knowledgebase (or multiple knowledgebases) and generate one or more patterns and/or can map information known about the machining parameter to the information known about other machining parameters. For example, the user can select the range of cutting speed and feed rate (e.g., range of machining parameters, constraints, etc.) within which to optimize. The predictive analytics of system 100 can determine that, if information of the range of machining parameters is similar to one or more other tool life models, the tool life models of the similar range of machining parameters can be utilized to facilitate automatically generating recommended optimal machining parameters. The tool life models with the cutting speed and feed rate within the selected range of machining parameters can be used to automatically generate the recommended optimal machining parameters.

The computer processing systems, computer-implemented methods, apparatus and/or computer program products described herein can employ hardware and/or software to generate tool life models that are highly technical in nature, that are not abstract and that cannot be performed as a set of mental acts by a human. For example, the one or more embodiments can perform the lengthy and complex interpretation and analysis on a copious amount of available information to generate tool life models and determine which tool life models should be utilized for the selected range of machining parameters (e.g., constraints). Accuracy can be evaluated by comparing a training set with a test set. After training a model employing a training set, accuracy can be calculated using a test set by computing percentage of output generated by the model running on the training set elements that matches a predicted target.

As a tool cuts material, it can wear out. There can be a cost trade-off between tool wear, tool life and cycle time, which can affect the operating cost and tooling cost. For example, the machining parameters can include cutting speed and feed rate. At conservative machining parameters, the cycle time (e.g., machining time) is long and the tool life is also long, and the cycle time can dominate the total operating cost. However, if an operator feed a cutting tool aggressively against a material, multiple tools may be required to make a cut, and the tooling cost can dominate the total operating cost. In the middle is a balance between cycle time, tool life and/or tool change time.

One or more embodiments herein can employ a web-application to provide a user interface for optimization of the operating parameters as well as data visualization and to save the data. For example, the web-application can allow a user to build a database and calculate the optimal machining parameter. The web-application can be a cloud based implementation of the analysis and recommendation provided to the user in real time. The web-application can be utilized to perform the optimization analysis on a cloud based server and transmit the recommendation to a user at a computer or a remote computer. The user can choose whether to apply the changes and test the recommended optimal operating parameters. If the recommended optimal operating parameters is applied, those results can be another data point that can be added to the database to update the statistical tool life model. The database can be queried for matches to automate the optimization.

In various embodiments, the modeling component 108 can generate tool life models using a tool wear data set. The tool wear data set can represent tool wear data collected during production (e.g., production data) from shop floors or from expert opinions. The tool wear data can also come from experimental data. The production data can include measured tool wear value and operating data such as cutting time or temperature. It is appreciated that operating data can include other types of data relevant to the wear of a tool. The tool life modeling can be based on reliability methods, and Bayesian updating, on tool wear data generated using expert opinions and tool wear data collected from machining operations from shop floors. For example, the tool wear data can be presented in a probability distribution function (pdf). The pdf can be updated with tool wear data, from experiments for example, using the Bayes' theorem. The tool wear data can be used to create a probabilistic model that can include uncertainty in tool life. The reliability methods can generate reliability models for tools based on tool wear measurements obtained at the time of tool replacement. The data-driven tool life modeling approach can enable a statistical approach for continuous learning and for producing predictions of expected tool life and the corresponding uncertainty.

The tool life can depend on the machining parameters (e.g., cutting speed, feed rate and depth of cut), material type, different suppliers can have different tool life, the geometry of the tool, the coolant information, etc. The tool life models can be used to identify the optimal cutting speed and feed rate. The tool wear data collected from the shop floor can also be used to update the tool life models. As the database grows, the tool life models can be improved to reduce uncertainty in tool life and enable faster convergence to the optimal cutting speed and feed rate.

The tool wear data can be collected by measuring the tool wear on the physical actual insert or tool. The users can measure the tool wear value of the insert or tool. For example, as a tool is cutting, the edge of that tool or insert can become worn down and measurements of the tool wear on that insert edge can be taken under a microscope. Measurements of the tool wear can be taken at the time of replacement or at successive intervals. For example, the tool wear can be measured from images taken under the microscope. The tool can complete the operation or a part of the operation, stop and have a photo taken under the microscope. This process can be repeated until the tool is replaced. Multiple measurements can be taken for each tool to note the wear of the tool as a function of cut time for the given setup and operating parameters. Every measurement taken can be a data point that can be added to the database to enhance the tool life models.

The tool life can also be affected by the coolant type used to cool down the tool. In order to cool down the tools and the surface of the tools, a coolant can be sprayed on the tools or the tip of the tools. The coolant type can be flood coolant or high-pressured coolant. A flood coolant is not pressurized whereas a high-pressured coolant can have 10 times the amount of pressure. A high-pressured coolant can be more effective in removing heat because it can more quickly take away the heat generated during the machining process.

The recommendation component 110 can generate recommended optimal operating parameters for machining operations to minimize total operating cost. The recommendation component 110 can employ the tool life models and user specified baseline operational parameters to generate the recommended optimal operating parameters. The recommended optimal operating parameters can include cutting speed and feed rate. Furthermore, the recommended optimal operating parameters (e.g., generated operating parameters) can be used to control the cutting speed and the feed rate. The user specified baseline operational parameters can include machine details, machining parameters such as cutting speed, feed rate, and depth of cut, material type, type of cut, tool setup, tool type; tool cost, number of tool usages, coolant conditions, labor rate, etc. For example, the recommendation component 110 can employ the statistical tool life model (e.g., tool life model) generated using tool wear data collected during production from shop floors or from expert opinions. As the database increases, the tool life modeling can be improved by reducing uncertainty in predictions. If there are no data, expert opinions or engineering judgment can be employed to create the tool life models. For example, an expert opinion can be that operating a tool under a certain machining parameter can result in a tool life between 5 minutes (min) and 15 min. That information can be used to create the statistical tool life model.

The system 100 can be a web-application that can generate the recommended optimal operating parameters on a cloud server to be transmitted to a remote computer. The web-application can employ a user interface (e.g., user interface component 302) to allow the users to run simulations, visualize results and save the tool wear data the tool wear database. For example, the users can run simulations (e.g., optimization) on the web-application, which can employ the recommendation component 110 to generate the recommended optimal operating parameters (e.g., optimization results). If the optimization yields a machining cost savings above a threshold that warrant changing the settings of the machining parameters, the user can run a validation and gather tool wear results. If the expected improvement does not warrant a change in the settings, the user can terminate the optimization. The data point resulting from testing (e.g., running the validation or applying the optimization results) the recommended operating parameters can be added to the database to update the statistical tool life model.

Figure 2:
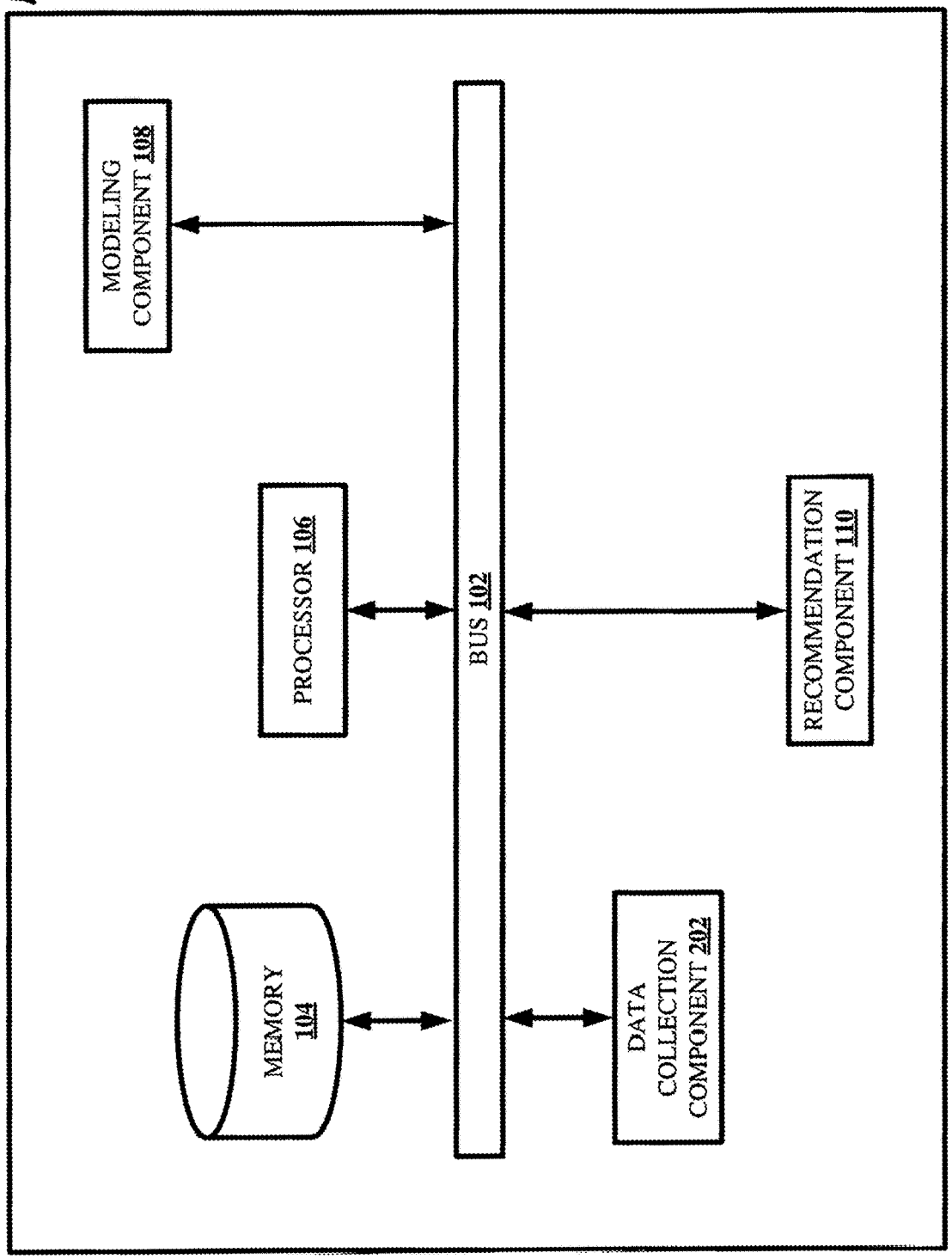
FIG. 2 illustrates a block diagram of an example, non-limiting system facilitating recommending optimal operating parameters including a data collection component in accordance with one or more embodiments described herein.

FIG. 2 illustrates a block diagram of an example, non-limiting system facilitating recommending optimal operating parameters including a data collection component 202 in accordance with one or more embodiments described herein. Repetitive description of like elements employed in other embodiments described herein is omitted for sake of brevity. The data collection component 202 can build the tool wear data set through real-time collection of the tool wear data from the shop floors. For example, the tool wear value can be measured by a user and input in the data collection component 202. The data collection component 202 can also build the tool wear data set by collecting data from expert opinions. For example, expert opinions as to the tool life of a tool operating under a certain machining parameter can be input in the data collection component 202. The data collection component 202 can also collect the user specified baseline operational parameters. It is appreciated that the data collection component can also collect tool wear data from literatures or text documents.

It is appreciated that the data collection component 202 can employ artificial intelligence to infer the tool wear data set. The data collection component 202 can infer the tool wear data set from the production data. The production data can include measured tool wear value and operating data such as cutting time or temperature. For example, the data collection component 202 can infer the amount of wear on a tool based on the cutting time or temperature endured by the tool. The higher the amount of cutting time or temperature, the higher measured tool wear value will be. It is also appreciated that the data collection component 202 can employ artificial intelligence to analyze other operating data that can be inferred to determine the tool wear data. For example, depending on the material the tool is made of, the data collection component 202 can employ artificial intelligence to infer the amount of wear on the tool based on the cutting time, temperature, cutting speed, feed rate, etc., that was that applied on the tool.

Some embodiments of the present invention herein can employ artificial intelligence (AI) to facilitate automating one or more features of the present invention. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present invention, components of the present invention can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 3:
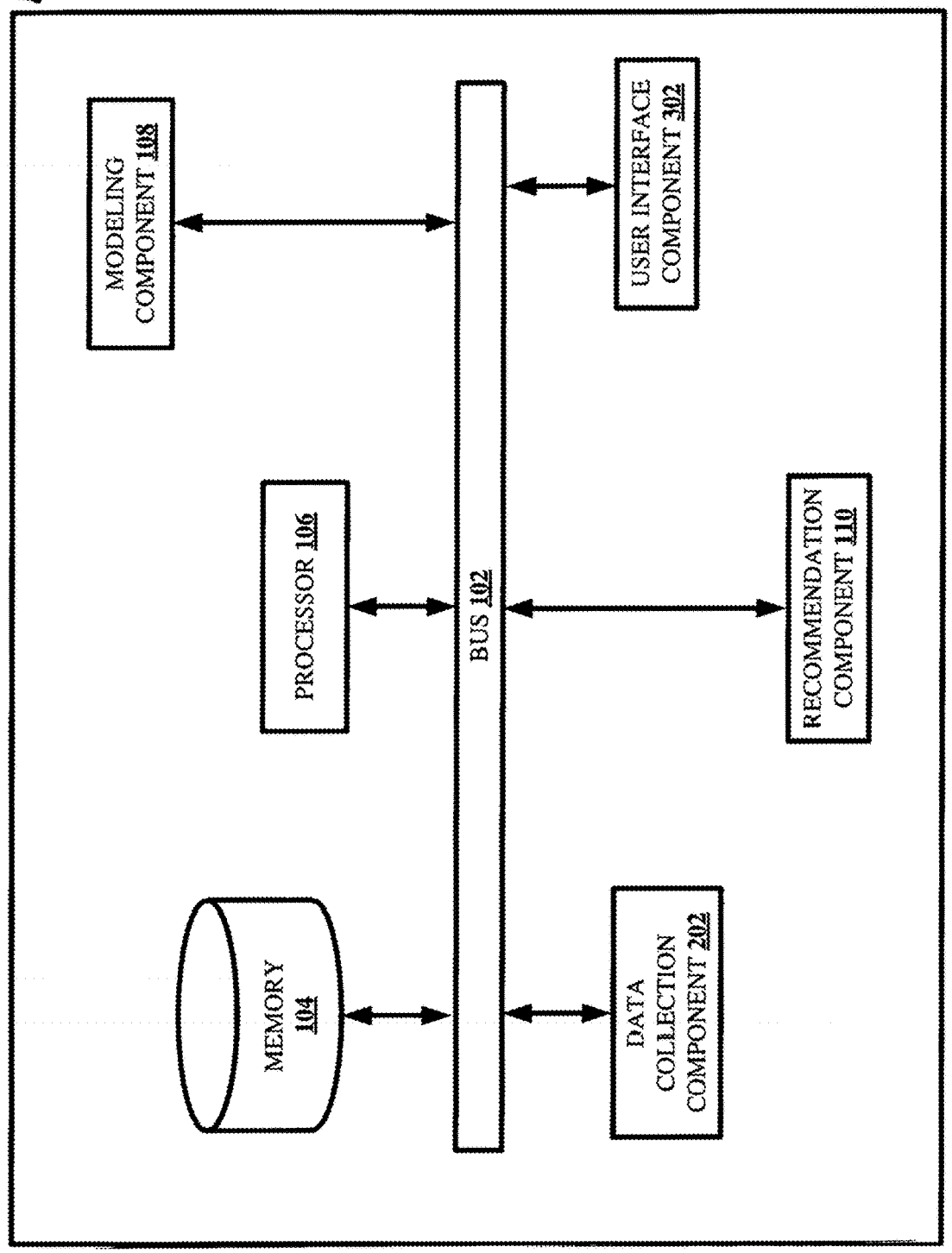
FIG. 3 illustrates a block diagram of an example, non-limiting system facilitating recommending optimal operating parameters including a user interface component in accordance with one or more embodiments described herein.

FIG. 3 illustrates a block diagram of an example, non-limiting system 300 facilitating recommending optimal operating parameters including a user interface component 302 in accordance with one or more embodiments described herein. Repetitive description of like elements employed in other embodiments described herein is omitted for sake of brevity. The user interface component 302 can provide a user interface for a user to input the user specified baseline operational parameters. The user interface component 302 can also provide a user interface for a user to input the measured tool wear value. For example, a user can take measurements of the tool wear value from the images taken under a microscope and input that data into the data collection component 202 using the user interface component 302.

The user interface component 302 can also provide views of the tool wear data inputted into the data collection component 202. The tool wear data can be employed by the modeling component 108 to generate tool wear models. The recommendation component 110 can employ the tool wear models to generate the recommended optimal operating parameters. The user interface component 302 can also provide views of the recommended optimal operating parameters.

The user can determine whether to apply the recommended operating parameters. For example, the user can determine to test the recommended optimal operating parameters if the cost reduction is greater than threshold. In contrast, if the cost reduction is less than threshold, the user can determine not to apply the recommended operating parameters. If the recommended operating parameters is applied, the resulting new data points can also be inputted into the data collection component 202. Additional tool wear value can be measured by the user and input into the data collection component 202 by employing the user interface component 302. The modeling component 108 can update the tool life models and the optimal operational parameters based on the measured tool wear value.

FIG. 4 illustrates an example, non-limiting equation 1000 facilitating recommending optimal operating parameters in accordance with one or more embodiments described herein. Repetitive description of like elements employed in other embodiments described herein is omitted for sake of brevity. The total operating cost (e.g., machining cost) can be represented by the equation $$C = C_T + C_F = t_m \times C_{sh} + \left( \frac{t_{ct}}{n_{uf}} \times C_{sh} + \frac{C_N + (C_r * n_{ar})}{(n_{uf}/n_i) * (n_{ar} + 1)} \right).$$

The variable C can represent the total operating cost or machining cost. The variable $C_F$ can represent the tool or insert usage costs per feature or part. The variable $n_{uf}$ can represent the number of features per tool. The feature per tool can define the number of cuts that can be performed with one tool. If two tools are required to make a cut, the feature per tool would be 0.5. If 3 tools are required, 4 tools, 5 tools, the feature per tool would be ⅓, ¼, ⅕, etc. If multiple features can be performed with one tool, the feature per tools would be 2, 3, 4, 5, etc. The variable $t_{ct}$ can represent the tool change time in minutes. The variable $C_{sh}$ can represent the shop rate in dollar per minute. The variable $C_N$ can represent the cost of a new tool. The variable $C_r$ can represent the regrind cost. The variable $n_i$ can represent the number of insert edges per tool. The variable $n_{ar}$ can represent the number of regrinds. The variable $C_T$ can represent the cost of time per feature or part. The variable $t_m$ can represent the cycle time in minutes.

Figure 5:
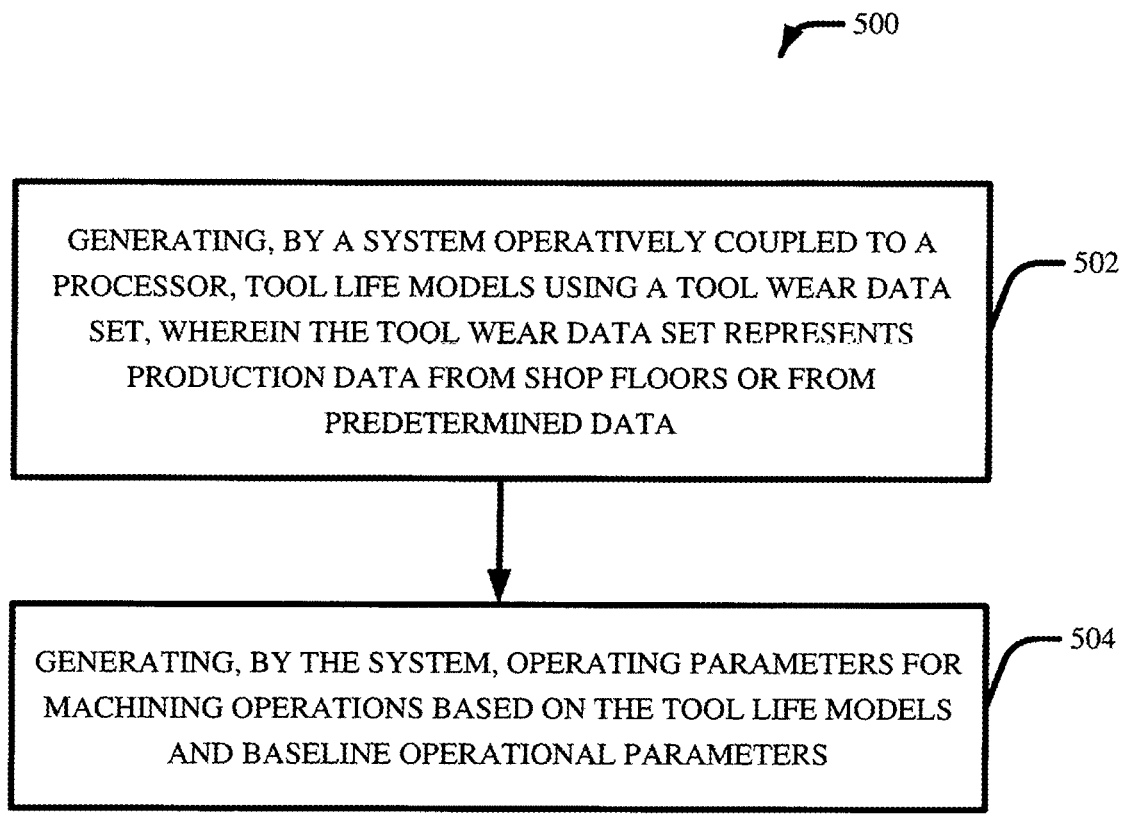
FIG. 5 illustrates an example, non-limiting computer-implemented method facilitating recommending optimal operating parameters in accordance with one or more embodiments described herein.

FIG. 5 illustrates an example, non-limiting computer-implemented method 500 facilitating recommending optimal operating parameters in accordance with one or more embodiments described herein. Repetitive description of like elements employed in other embodiments described herein is omitted for sake of brevity. At 502, the computer-implemented method 500 can comprise generating (e.g., via the modeling component 108), by a system operatively coupled to a processor, tool life models using a tool wear data set, wherein the tool wear data set represents tool wear data collected during production from shop floors or from expert opinions. For example, the user can measure the tool wear value on the tool by taking an image under a microscope. The user can input that tool wear value into the data collection component 202 by employing the user interface component 302. The user can also input expert opinions or the user's engineering judgement, especially if there are no data to input. For example, based on the user's engineering judgement, the user can input that under certain machining parameters, the tool life would be between 5 min and 15 min. The input tool wear data can be used by the modeling component 108 to generate tool life models.

At 504, the computer-implemented method 500 can comprise generating (e.g., via the recommendation component 110), by the system, recommended optimal operating parameters for machining operations to minimize total operating cost by employing the tool life models and user specified baseline operational parameters. The recommendation component 110 can employ the user specified baseline operational parameter to fit a statistical tool life model. Examples of the user specified baseline operational parameters can include machining cost, material type, tool type, tool cost, number of usages, coolant conditions and labor rate. As the database increases, the tool life models can be updated to decrease uncertainty in the tool life model and the optimal operating parameter recommendations.

Figure 6:
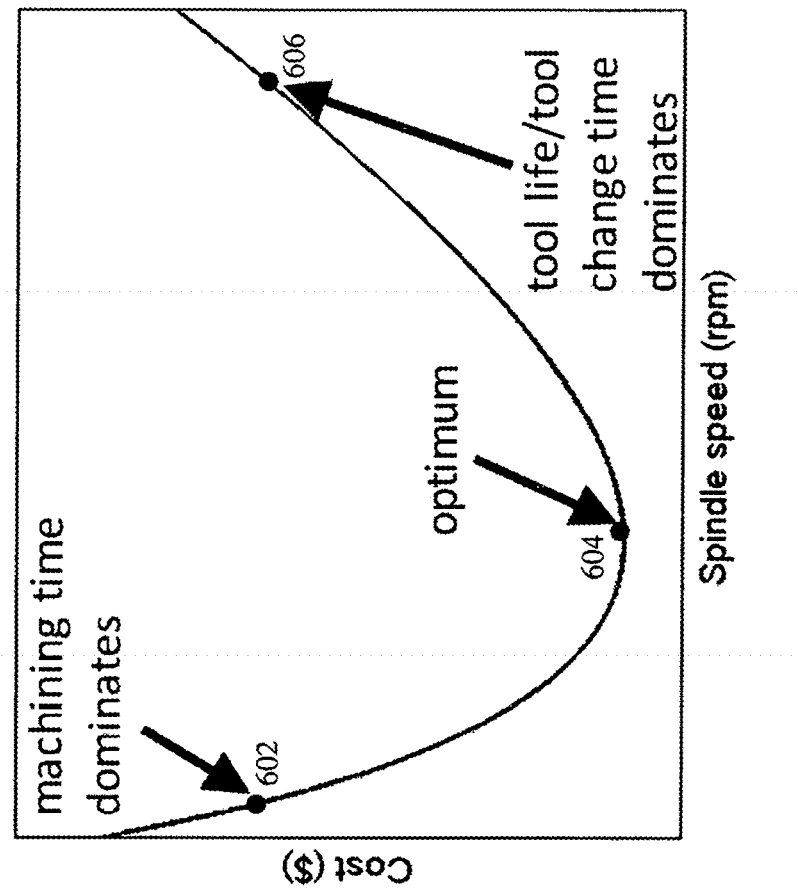
FIG. 6 illustrates an example, non-limiting graph depicting optimal parameter in accordance with one or more embodiments described herein.

FIG. 6 illustrates an example, non-limiting graph 600 depicting optimal parameter in accordance with one or more embodiments described herein. Repetitive description of like elements employed in other embodiments described herein is omitted for sake of brevity. The point 602 represents an area on the graph 600 that machining time dominates. The point 604 represents an area on the graph 600 that is the optimum. The point 606 represents an area on the graph 600 that tool life and/or tool change time dominates.

There can be a trade-off between cycle time and tool life and/or tool change time due to limited redundant tooling or low tool life. As a tool cuts material, the tool can wear out, which can affect the operating cost, tool life and tooling cost. The total machining cost (e.g., operating cost) per feature or part can be calculated using the equation $C=C_T+C_F$. The variable $C_F$ can represent the tool or insert usage costs per feature or part. The tool change time, tool cost and regrind cost can be factors affecting the tool or usage costs per feature or part. The variable $C_T$ can represent the cost of time per feature or part. The cycle time and shop rate can be factors affecting the cost of time per feature or part.

As an example, if the cutting speed and feed rate values are conservative, then the cycle time and the tool life will be long. As a result, the cost of machining time dominates (e.g., point 602). However, if the cutting speed and feed rate is aggressive or fast, then multiple tools may be required to make a cut. As a result, the tooling cost will dominate the machining cost (e.g., point 606). The point 604 is the optimum that balances the trade-off between machining time and tool life and/or tool change time. For example, if a tool is $1 per tool and the shop rate is $200 an hour, the optimal may be to cut faster (e.g., higher cutting speed and feed rate) and use 10 tools because even then the tooling cost would only be $10. However, that might not be possible due to some programming constraints which may not allow more than 2 tool changes. So even if the theoretical optimum may be to use 10 tools, there might be some practical constraints that limit the number of tool changes. In certain situations, it may not be possible to change a tool even once because once it goes into the cut it might not be possible to stop and resume the cutting to change the tool.

Figure 7:
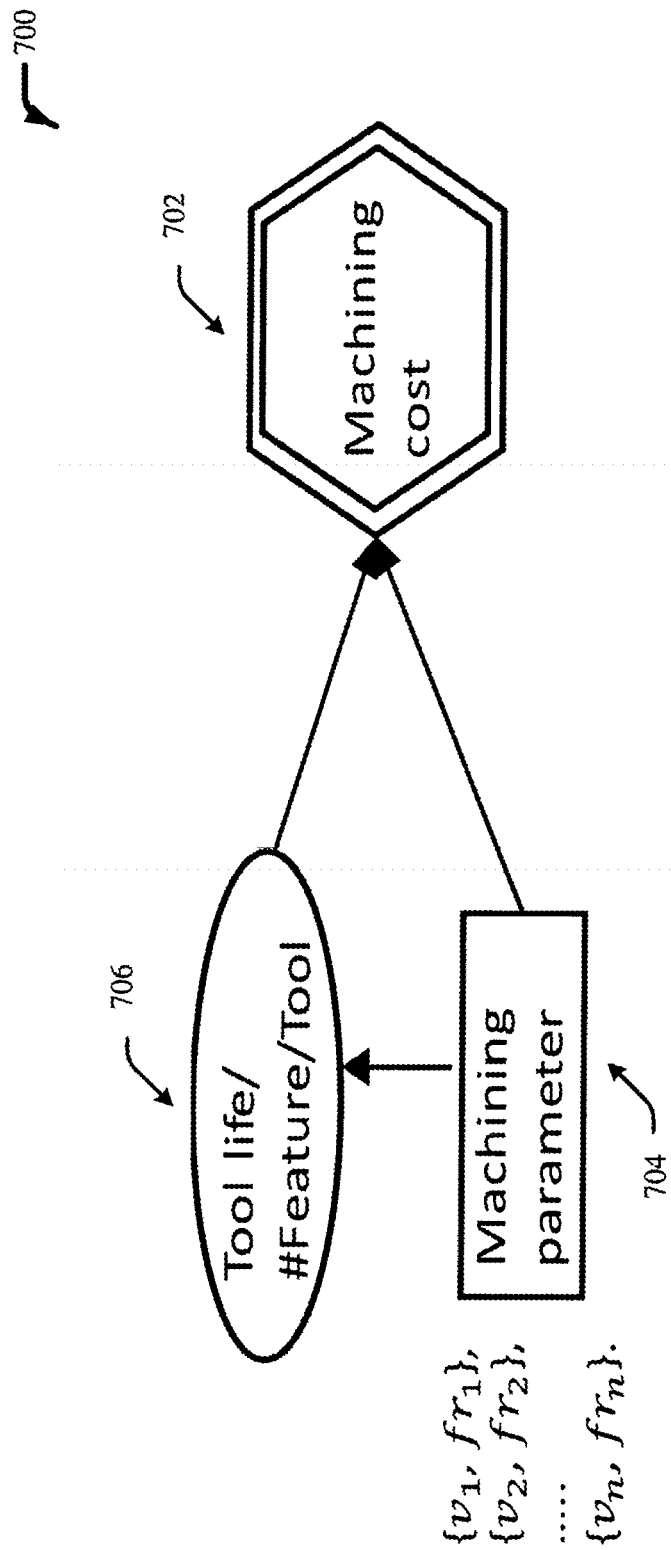
FIG. 7 illustrates an example, non-limiting decision analytic framework for optimal machining parameter selection in accordance with one or more embodiments described herein.

FIG. 7 illustrates an example, non-limiting decision analytic framework 700 for optimal machining parameter selection in accordance with one or more embodiments described herein. Repetitive description of like elements employed in other embodiments described herein is omitted for sake of brevity. The machining cost 702 is dependent on the machining parameter 704 or cutting speed and feed rate (e.g., v, fr) and tool cost. Tool life (e.g., tool life or feature per tool 706) is also dependent on the machining parameter 704. The decision is the choice of machining parameter, (e.g., $\{v_1, fr_1\}, \{v_2, fr_2\}, \ldots, \{v_n, fr_n\}$. The uncertainty is in tool life and therefore feature per tool (e.g., tool life or feature per tool 706). The probabilistic model of the tool life and number of feature per tool, for example, can be generated using all available tool wear data collected from the production floor or expert opinions and manufacturer recommendations. The value is in the machining cost 702. The objective is to select optimal machining parameters to minimize total machining cost considering the uncertainty in tool life. Furthermore, the optimization can incorporate user risk tolerance, process constraints and tool change constraints that can affect the machining cost 702. As more information is made available in the form of tool wear data from production floor, the uncertainty in tool life decreases which, in turn, reduces the uncertainty in predictions.

Figure 8:
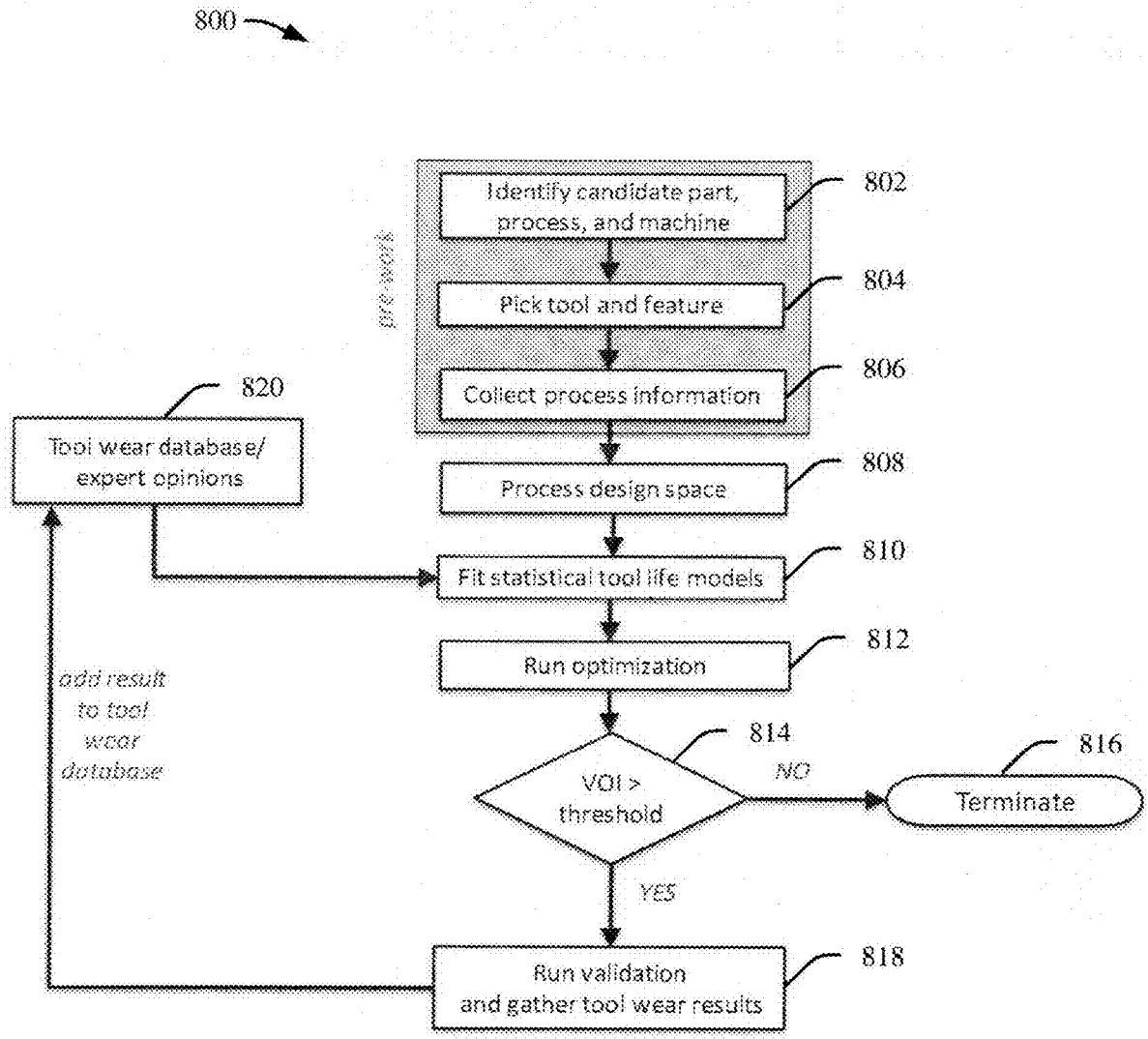
FIG. 8 illustrates an example, non-limiting flow diagram facilitating recommending optimal operating parameters in accordance with one or more embodiments described herein.

FIG. 8 illustrates an example, non-limiting flow diagram 800 facilitating recommending optimal operating parameters in accordance with one or more embodiments described herein. Repetitive description of like elements employed in other embodiments described herein is omitted for sake of brevity. At 802, identify (e.g., based on the baseline process information or via the web application and user interface 302) the candidate part or tool, the process and the machine (e.g., with the inserted tool). The candidate part or tool information can include the type of tool, tool life, tool cycle, tool cost, number of usages for the tool, etc. The process or process information can be the cutting speed, feed rate, depth of cut, features per tool, inserts per tool, cut time, tool change time, percentage of tool utilization, wear type, wear level, operating or machining cost, etc. At 804, pick (e.g., based on the baseline process information or via the web application and user interface 302) the tool and features or prioritize the tool and features. Prioritizing the parts or tools can be based on determining whether it is a part or tool has a long cycle time or a high tool cost. For example, does the machining time dominate or does the tool life and/or tool change time dominate, as illustrated in FIG. 6. At 806, collect (e.g., based on the baseline process information or via the web application and user interface 302) the process information by compiling the operational parameters, tool life and cost factors. The information in 802, 804 and 806 can be based on the baseline process information or user specified baseline operational parameters.

At 808, process (e.g., based on the baseline process information or via the web application and user interface 302) the design space. Processing the design space can entail defining the constraints. The constraints can be the cutting speed limits, feed rate limits, or number of allowable tool change limits. The constraint can be the minimum and maximum cutting speed, the minimum and maximum feed rate, the minimum and maximum features per tool. For example, the user specified baseline cutting speed can be 180 surface feet per minute (sfm), and the user can specify that the maximum cutting speed is 250 sfm. In another example, the constraint can be 1 to 2 features per tool. Furthermore, the constraint can also be the probability of cost reduction. There can be uncertainty in the calculations, and the users can specify (e.g., set as a constraint) the probability of success. This can be used to incorporate some risk aversion in the calculations. As the database increases and there are more tool wear data including data for the supplier and the type of material, the uncertainty in the calculation can decrease.

At 810, fit (e.g., via the modeling component 108) the statistical tool life model (e.g., fitted tool life model, tool life model, etc.). The tool life model can be designed to estimate the tool life mean and associated uncertainty as a function of key operating parameters such as cutting speed and feed rate. The modeling component 108 can fit statistical tool life model using tool wear data collected during production from shop floors or from expert opinions. If there are no data, the tool life model can be generated using expert knowledge or expert opinions. Furthermore, the users have the privy to edit the results in the tool life models. For example, the user can edit the tool life model value from 17 min to 15 min based on the user's experience. The user can save the modified results to the database. The recommendation component 110 can employ the tool life model to generate recommendations.

At 812, run (e.g., via the web application and user interface 302) the optimization, which can generate (e.g., via the recommendation component 110) the optimal cutting speed, the optimal feed rate, baseline cost, and the predicted cost and percent of savings with optimization. The machining cost can be calculated using the equation 400 above in FIG. 4. The expected machining cost calculation can be performed using the methodology 900 below in FIG. 9. The optimization can be performed on a web-application that can provide the user interface 302 for visualization.

At 814, determine (e.g., by the user) whether the value of information (VOI) is greater than the threshold. The VOI can be defined as the difference between the optimal machining cost before experiment and the expected optimal machining cost after experiment. The VOI can also be defined as the expected improvement of the optimal machining cost after experiment. If no, then at 816, terminate (e.g., by the user via the web application and user interface 302). Terminate the optimization if the expected improvement does not warrant change in the settings. For example, if the optimization is predicted to yield a low percentage of savings below the threshold, which is not worth the effort to change the operating parameters. If yes, then at 818, run (e.g., by the user via the web application and user interface 302) the validation and gather the tool wear results. If the percentage of savings is above a certain threshold, the user may choose to optimize and change the operating parameters. The tool wear results gathered from running the validation (e.g., optimizing) are added to the tool wear database and can be used to update the statistical tool life models at 810.

At 820, add (e.g., via the data collection component 202) the tool wear results gathered from running the validation to the tool wear database. The tool wear database can also contain expert opinions or engineering judgement. The data in the tool wear database can be used to fit the statistical tool life model at 810.

Figure 9:
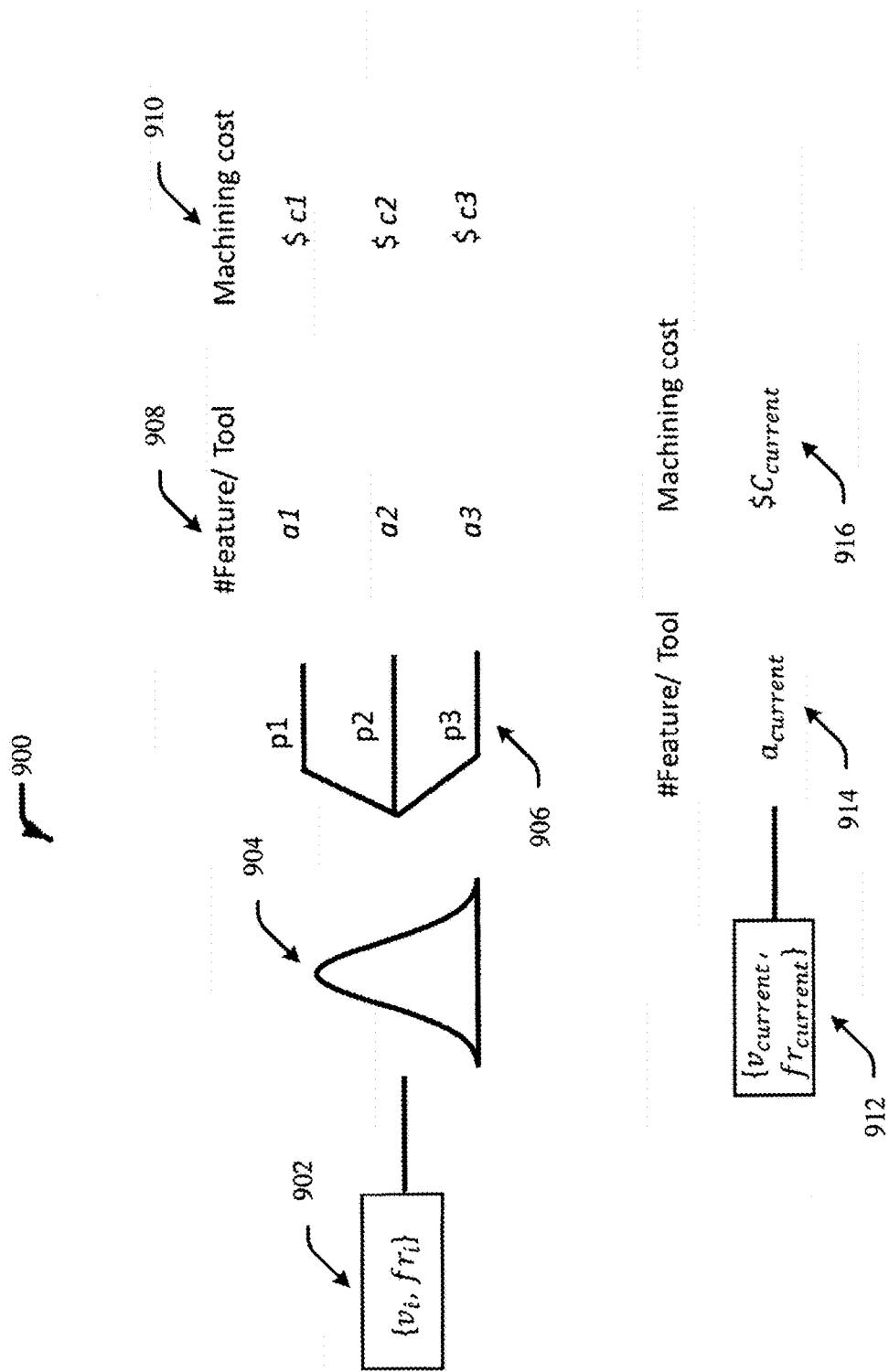

FIG. 9 illustrates an example, non-limiting methodology 900 facilitating recommending optimal operating parameters in accordance with one or more embodiments described herein. Repetitive description of like elements employed in other embodiments described herein is omitted for sake of brevity. The candidate cutting speed and feed rate values 902 (e.g., $v_i, f_i$) can be a candidate point on the tool life distribution 904. The tool life distribution 904 can come from the probabilistic tool life model in the design space. The probabilistic 906 can be the probabilities of having different features per tool due to the probabilistic tool life model. The example probabilistic 906 has three probabilistic values: p1, p2 and p3. The feature per tool 908 can describe the number of feature that a tool can perform or cut. The example feature per tool 908 has three values: a1, a2 and a3 associated with the probability values (e.g., probabilistic 906) p1, p2, and p3, respectively. The feature per tool 908 can correspond with the three probabilistic values. The machining cost 910 can be the cost of performing a feature or cut. The example machining cost 910 has three machining cost values: c1, c2 and c3 associated with the probability values (e.g., probabilistic 906) p1, p2, and p3, respectively The machining cost values can also correspond with the probabilistic values and the feature per tool values. The candidate cutting speed and feed rate values 902 can be an integral part of the machining cost 910. The machining cost 910 can be a function of the candidate cutting speed and feed rate values 902 (e.g., $v_i, f_i$). The machining cost 910 can be calculated using the equation 400 in FIG. 4. As such, the expected cost or candidate machining cost can be calculated by multiplying the different probabilistic values with the respective (e.g., corresponding) machining cost values, and sum the resulting values. In this example, the expected cost using the candidate cutting speed and feed rate values 902 can equal to (p1*c1+p2*c2+p3*c3). Similarly, the current cutting speed and feed rate value 912 (e.g., $v_{current}$, $fr_{current}$) can be used to calculate the current machining cost 916 (e.g., $C_{current}$) using the current feature per tool value 914 (e.g., $a_{current}$). The current machining cost 916 can be a function of the current cutting speed and feed rate values 912. The current machining cost 916 can be calculated using the equation 400 in FIG. 4.

FIG. 10 illustrates an example, non-limiting methodology 1000 facilitating recommending optimal operating parameters in accordance with one or more embodiments described herein. Repetitive description of like elements employed in other embodiments described herein is omitted for sake of brevity. The current cutting speed and feed rate values 1002 are 70 surface feet per minute (sfm) and 0.008 inches per revolution (ipr), respectively. The tool life distribution 1004 can be a graph of the probability distribution function (pdf) against tool life in minute (min); in FIG. 10, the tool life distribution 1004 has mean value of 67 minutes and a variance of 1 minute at the current cutting speed and feed rate. At the current cutting speed and feed rate, the cycle time ($t_m$) is 60 minutes. Based on the tool life distribution and cycle time, the probability (e.g., probabilistic 1006) of completing the cycle time with the tool is 1; therefore, the feature per tool 1008 is also 1. The corresponding machining cost 1010 is $120. The machining cost can be calculated using the equation 400 above in FIG. 4.

The candidate cutting speed and feed rate values 1012 are 100 sfm for the candidate cutting speed and 0.012 ipr for the candidate feed rate. At the candidate cutting speed and feed rate, the tool life distribution 1014 has a mean value of 25.9 minutes and variance of 4 minutes and the cycle time is 28 minutes. Based on the tool life distribution and cycle time, the probability (e.g., probabilistic 1016) has two values: 0.85 and 0.15; there is a 0.85 probability that two tools will be required to complete the cycle time and 0.15 probability that the single tool car complete the cycle time. Therefore, the feature per tool 1018 also has respective values: 0.5 and 1; and the machining cost 1020 also has two respective values:

$60 and $40. To summarize, in this example, there is 85% chance the feature per tool will be 0.5, which would have a $60 machining cost. There is also 15% chance the feature per tool will be 1, which would have a $40 machining cost. The expected value (EV) or expected cost can be calculated by multiplying the two probabilistic values (e.g., 0.85 and 0.15) with the respective machining costs ($60 and $40) and sum the resulting values. The EV or expected cost is $57 (e.g., 0.85*$60+0.15*40). The EV calculation can be performed at multiple candidate machining parameter combinations; the optimal is where the difference between current cost and EV is maximum.

Figure 11:
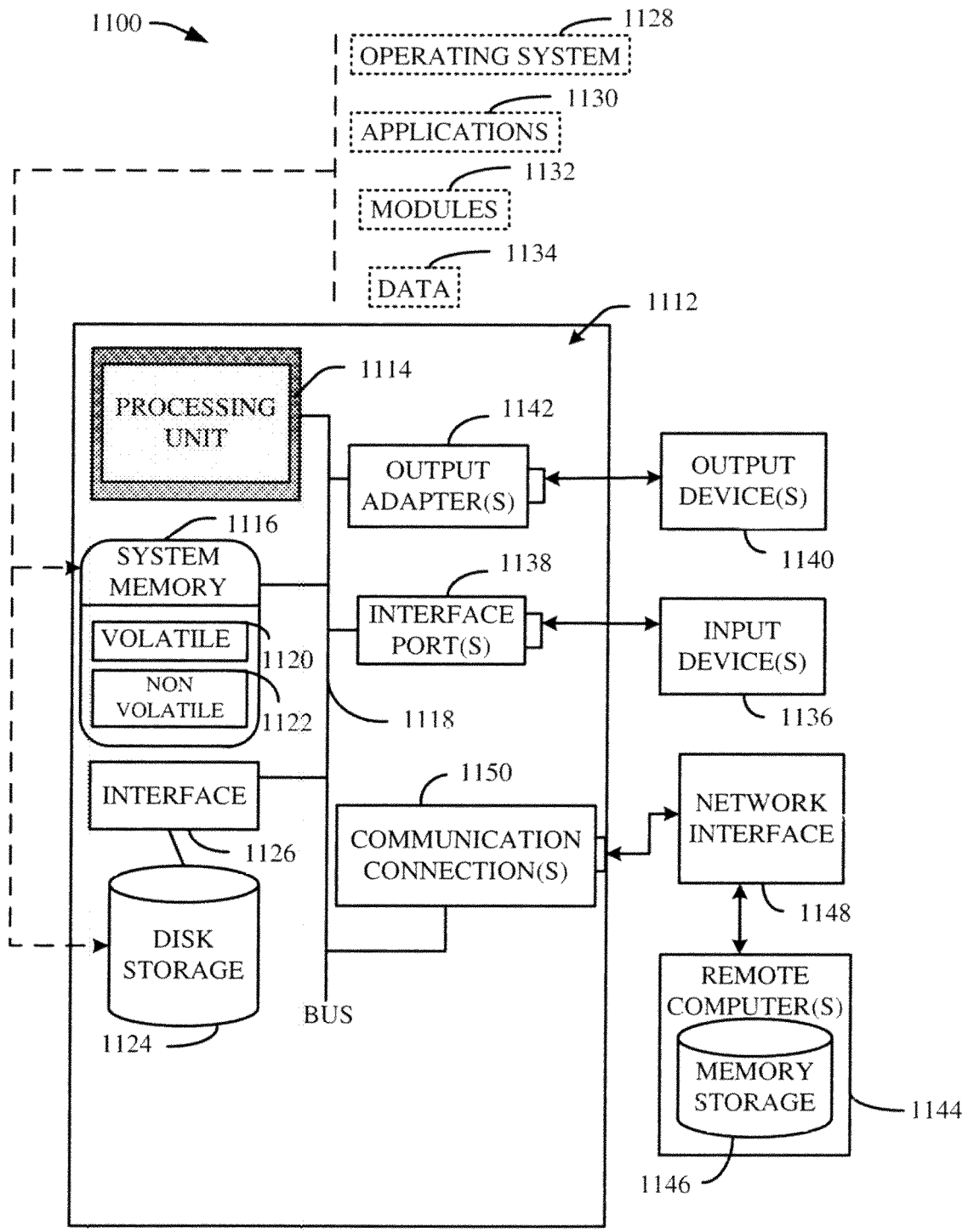
FIG. 11 illustrates a block diagram of an example, non-limiting operating environment in which one or more embodiments described herein can be facilitated.
Figure 12:
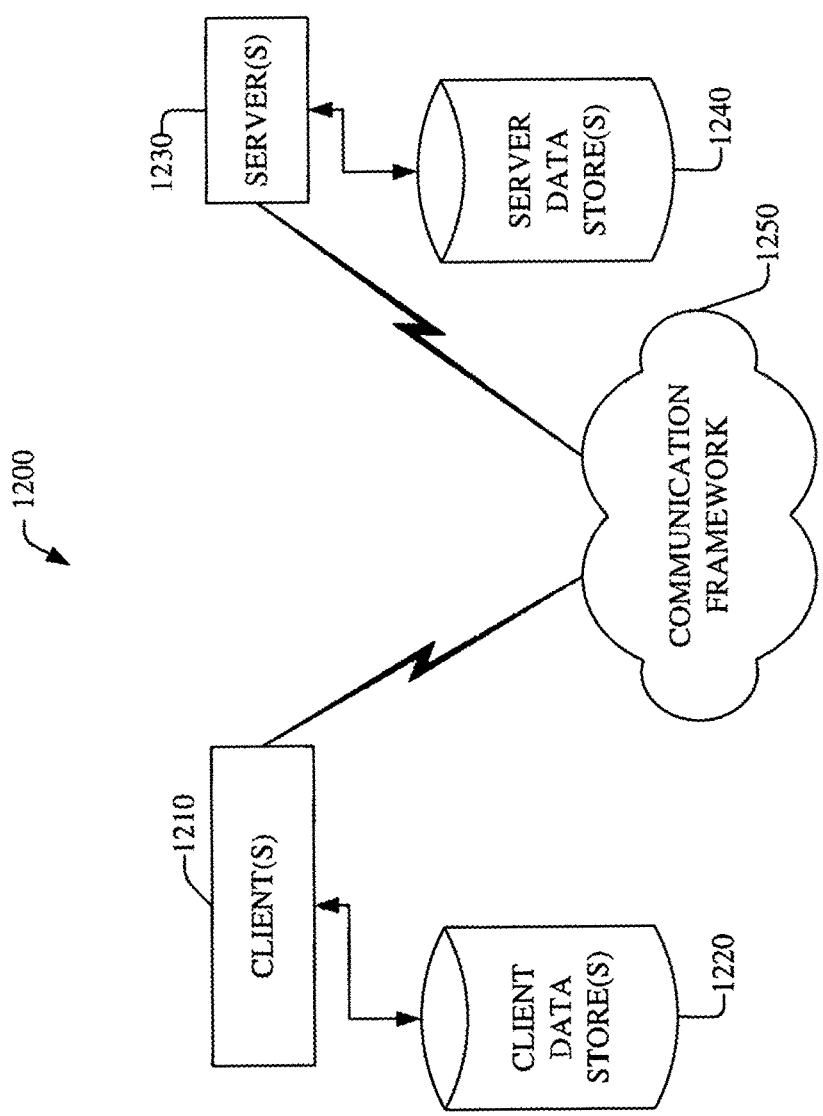
FIG. 12 is a schematic block diagram of a sample-computing environment.

In order to provide a context for the various aspects of the disclosed subject matter, FIGS. 11 and 12 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 can also include random access memory (RAM), which acts as external cache memory. By way of illustration and not limitation, RAM is available in many forms such as static RANI (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 (e.g., computing system) with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server (s) 1230 are operatively connected to one or more server data store(s) 1240 that can be employed to store information local to the servers 1230.

It is to be appreciated and understood that components (e.g., flow management light, flow management component, sensor component, instrument, component, network component, processor component, data store, . . . ), as described with regard to a particular system or method, can include the same or similar functionality as respective components (e.g., respectively named components or similarly named components) as described with regard to other systems or methods disclosed herein.

Embodiments of the disclosed subject matter can be a system, a method, an apparatus and/or a machine (e.g., computer) program product at any possible technical detail level of integration. The machine program product can include a machine (e.g., computer) readable storage medium (or media) having machine readable program instructions thereon for causing a processor to carry out aspects of the disclosed subject matter. The machine readable storage medium can be a tangible device that can retain and store instructions for use by an instruction execution device. The machine readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives machine readable program instructions from the network and forwards the machine readable program instructions for storage in a machine readable storage medium within the respective computing/processing device. Machine readable program instructions for carrying out operations of various aspects of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The machine readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the machine readable program instructions by utilizing state information of the machine readable program instructions to customize the electronic circuitry, in order to perform aspects of the disclosed subject matter.

Aspects of the disclosed subject matter are described herein with reference to flowchart illustrations and/or block diagrams of methods, apparatus (systems), and machine program products according to embodiments of the disclosed subject matter. It will be understood that each block of the flowchart illustrations and/or block diagrams, and combinations of blocks in the flowchart illustrations and/or block diagrams, can be implemented by machine readable program instructions. These machine readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine readable program instructions can also be stored in a machine readable storage medium that can direct a computer, a programmable data processing apparatus, and/or other devices to function in a particular manner, such that the machine readable storage medium having instructions stored therein comprises an article of manufacture including instructions which implement aspects of the function/act specified in the flowchart and/or block diagram block or blocks. The machine readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can. In fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosed subject matter has been described above in the general context of machine (e.g., computer)-executable instructions of a machine program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the disclosed machine (e.g., computer)-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes computer executable components stored in the memory, wherein the computer executable components comprise:
   a modeling component that generates tool life models using a tool wear data set, wherein the tool wear data set is based on production data or predetermined data; and
   a recommendation component that generates operating parameters for machining based on the tool life models and baseline operational parameters to minimize a total operating cost, wherein the total operating cost is represented by $$C = C_T + C_F$$

where
   $C_F$=tool/insert usage costs per feature/part,
   $C_T$=cost of time per feature/part; and
      a component that uses the generated operating parameters to control cutting speed and feed rate.

2. The system of claim 1, further comprising a data collection component that builds the tool wear data set through real-time collection of the production data or the predetermined data and collects the baseline operational parameters.

3. The system of claim 2, wherein the data collection component also employs artificial intelligence to infer the tool wear data set, wherein the tool wear data set is inferred from the production data.

4. The system of claim 1, wherein the generated operating parameters include cutting speed and feed rate, and the baseline operational parameters can include machine details, machining parameters, wherein the machining parameters include at least one of cutting speed, feed rate, and depth of cut, material type, type of cut, tool setup, tool type, tool cost, number of tool usages, coolant conditions, and labor rate.

5. The system of claim 1, wherein the generated operating parameters reduces an initial cost to an updated cost, wherein the updated cost is lower than the initial cost, wherein the initial cost is cost of using the baseline operational parameters and the updated cost is cost of using the generated operating parameters.

6. The system of claim 1, wherein the production data includes measured tool wear value and operating data, wherein the operating data includes at least one of cutting time or temperature.

7. The system of claim 1, wherein the modeling component updates the tool life models based on a measured tool wear value.

8. The system of claim 1, wherein the total operating cost is represented by $$C = t_m \times C_{sh} + \left( \frac{t_{ct}}{n_{uf}} \times C_{sh} + \frac{C_N + (C_r * n_{ar})}{(n_{uf} / n_i) * (n_{ar} + 1)} \right)$$

where
$t_{ct}$=tool change time in minutes,
$n_{uf}$=number of features/tool,
$C_{sh}$=shop rate in \$/minutes,
$C_N$=tool cost,
$C_r$=regrind cost,
$n_i$=number of insert edges/tool,
$n_{ar}$=number of regrinds, and
$t_m$=cycle time in minutes.

9. A computer-implemented method, comprising:
   generating, by a system operatively coupled to a processor, tool life models using a tool wear data set, wherein the tool wear data set is based on production data or predetermined data; and generating, by the system, operating parameters for machining operations based on the tool life models and baseline operational parameters to minimize a total operating cost, wherein the total operating cost is represented by $$C=C_T+C_F$$

where
- $C_F$=tool/insert usage costs per feature/part,
- $C_T$=cost of time per feature/part; and utilizing, by the system, the generated operating parameters to control cutting speed and feed rate.

10. The computer-implemented method of claim 9, further comprising building the tool wear data set through real-time collection of the production data or the predetermined data and collecting the baseline operational parameters.

11. The computer-implemented method of claim 9, wherein the generated operating parameters reduces an initial cost to an updated cost, wherein the updated cost is lower than the initial cost, wherein the initial cost is cost of using the baseline operational parameters and the updated cost is cost of using the generated operating parameters.

12. The computer-implemented method of claim 9, wherein the production data includes measured tool wear value and operating data, wherein the operating data includes at least one of cutting time or temperature.

13. The computer-implemented method of claim 12, further comprising updating the tool life models based on the measured tool wear value.

14. The computer-implemented method of claim 9, wherein the total operating cost is represented by $$C = t_m \times C_{sh} + \left( \frac{t_{ct}}{n_{uf}} \times C_{sh} + \frac{C_N + (C_r * n_{ar})}{(n_{uf}/n_i) * (n_{ar}+1)} \right)$$

where
- $t_{ct}$=tool change time in minutes,
- $n_{uf}$=number of features/tool,
- $C_{sh}$=shop rate in $/minutes,
- $C_N$=tool cost,
- $C_r$=regrind cost,
- $n_i$=number of insert edges/tool,
- $n_{ar}$=number of regrinds, and
- $t_m$=cycle time in minutes.

15. A computer program product for facilitating generating operating parameters, the computer program product comprising a non-transitory computer readable storage medium having program instructions embodied therewith, the program instructions executable by a processor to cause the processor to:

generate tool life models using a tool wear data set, wherein the tool wear data set is based on production data or predetermined data; and
generate operating parameters for machining operations based on the tool life models and baseline operational parameters to minimize a total operating cost, wherein the total operating cost is represented by $$C=C_T+C_F$$

where
- $C_F$=tool/insert usage costs per feature/part,
- $C_T$=cost of time per feature/part; and utilize the generated operating parameters to control cutting speed and feed rate.

16. The computer program product of claim 15, wherein the program instructions are further executable to cause the processor to:
build the tool wear data set through real-time collection of the production data or the predetermined data and collect the baseline operational parameters.

17. The computer program product of claim 15, wherein the generated operating parameters reduces an initial cost to an updated cost, wherein the updated cost is lower than the initial cost, wherein the initial cost is cost of using the baseline operational parameters and the updated cost is cost of using the generated operating parameters.

18. The computer program product of claim 15, wherein the production data includes measured tool wear value and operating data, wherein the operating data includes at least one of cutting time or temperature.

19. The computer program product of claim 18, wherein the program instructions are further executable to cause the processor to:
update the tool life models based on the measured tool wear value.

20. The computer program product of claim 15, wherein the total operating cost is represented by $$C = t_m \times C_{sh} + \left( \frac{t_{ct}}{n_{uf}} \times C_{sh} + \frac{C_N + (C_r * n_{ar})}{(n_{uf}/n_i) * (n_{ar}+1)} \right)$$

where
- $t_{ct}$=tool change time in minutes,
- $n_{uf}$=number of features/tool,
- $C_{sh}$=shop rate in $/minutes,
- $C_N$=tool cost,
- $C_r$=regrind cost,
- $n_i$=number of insert edges/tool,
- $n_{ar}$=number of regrinds, and
- $t_m$=cycle time in minutes.

* * * * *